US 6,688,467 B2

(12) United States Patent
Krupka et al.

(10) Patent No.: US 6,688,467 B2
(45) Date of Patent: Feb. 10, 2004

(54) LIQUID PRODUCT SAMPLER WITH SAMPLE DEPOSIT AREA

(75) Inventors: Rudolf Krupka, Golden, CO (US); Lucy A. Beebe, Finksburg, MD (US); Richard W. Beebe, Finksburg, MD (US); Catholyn T. Griffiths, Phoenix, MD (US); Thomas R. Burtzlaff, Clarksville, MD (US); Henry J. Bouchat, Jr., Baltimore, MD (US); Leonard V. Lange, Abingdon, MD (US)

(73) Assignee: Arcade Marketings, Inc., New York, NY (US)

( * ) Notice: Subject to any disclaimer, the term of this patent is extended or adjusted under 35 U.S.C. 154(b) by 52 days.

(21) Appl. No.: 10/079,420

(22) Filed: Feb. 22, 2002

(65) Prior Publication Data

US 2002/0157983 A1 Oct. 31, 2002

Related U.S. Application Data

(60) Provisional application No. 60/270,637, filed on Feb. 23, 2001.

(51) Int. Cl.$^7$ ................................................ B65D 73/00
(52) U.S. Cl. ........................ 206/469; 206/581; 206/461; 206/466
(58) Field of Search ................................ 206/461, 466, 206/469, 484, 581; 428/56, 116, 905; 229/92.8; 283/56, 116

(56) References Cited

U.S. PATENT DOCUMENTS

| | | | |
|---|---|---|---|
| 4,484,768 A | * 11/1984 | Norfleet | ...................... 283/116 |
| 4,679,693 A | 7/1987 | Forman | |
| 4,923,063 A | * 5/1990 | Tararuj | ........................ 206/484 |
| 5,072,831 A | * 12/1991 | Parrotta et al. | ............. 206/232 |
| 5,391,420 A | 2/1995 | Bootman et al. | |
| 5,879,769 A | * 3/1999 | Greenland et al. | .......... 428/35.7 |
| 6,213,303 B1 | * 4/2001 | Harris et al. | ................. 206/581 |
| 6,223,503 B1 | * 5/2001 | Berman et al. | ................ 53/440 |
| 6,287,652 B2 | * 9/2001 | Speckhals et al. | .......... 428/35.2 |
| 6,301,860 B1 | * 10/2001 | Gunderman et al. | ........... 53/410 |
| 6,461,620 B2 | * 10/2002 | Dobler | ........................ 424/400 |

FOREIGN PATENT DOCUMENTS

| | | |
|---|---|---|
| EP | 1 013 193 A2 | 6/2000 |
| EP | 1 078 865 A | 2/2001 |

\* cited by examiner

*Primary Examiner*—David T. Fidei
(74) *Attorney, Agent, or Firm*—Dickstein Shapiro Morin & Oshinsky, LLP

(57) ABSTRACT

A cosmetic sampler package for a fluid product sample complies with postal regulations for subscription rate insertion in literature to be distributed through the U.S. Postal Service, and also provides a sampler unit having a transparent or translucent moisture vapor barrier layer substantially equivalent to that of a foil film. The product sampler is formed by sealing together top and bottom composite laminates to form a pouch for containing the product sample, and includes a window for viewing the product. The pouch shape includes a nozzle tip for controllably dispensing the product, and a perforated strip is cut across the nozzle so that the sampler can be easily opened. The sampler is affixed to a carrier card for insertion into a periodical, brochure or other literature. To protect the carrier card and the product, a sampling surface is provided on the carrier card under the nozzle so that the fluid product expelled from the opened pouch flows onto the sampling surface.

7 Claims, 6 Drawing Sheets

LIQUID PRODUCT SAMPLER WITH SAMPLE DEPOSIT AREA

This application claims the benefit of Provisional U.S. Patent Application Serial No. 60/270,637, filed Feb. 23, 2001, the disclosure of which is hereby incorporated by reference.

BACKGROUND OF THE INVENTION

1. Field of the Invention

The present invention relates to a product sampler package for presenting a fluid product sampler in a manner which complies with postal regulations for insertion in magazines, catalogs, periodicals, etc. under the subscription or periodicals rate classification for delivery to consumers through the mail system. The product sampler may contain a product having a fluid or volatile base such as water or other organic solvent. Examples of such products include, for example, liquid cosmetics, lotions, creams, gels, fragrances, ointments, etc.

2. Description of the Related Art

Many manufacturers of cosmetics, toiletries, beauty and skincare products, etc. commonly promote their products by distributing free samples or applications to current or potential consumers with the goal of building and/or maintaining customer loyalty for the products or product lines. One method of distributing such samples has been to give them to potential customers in a store in which the product is sold. A further reaching, more effective method has been to mail the sampler packages to a targeted audience through the U.S. Postal Service (USPS). Typically, the samplers are mailed as inserts in brochures, catalogs, magazines, or the like.

For distribution through the USPS, the samplers can be mailed either under a non-discounted rate classification or under a more economical periodical/subscription rate classification. To qualify for classification under the subscription rate, each sampler package must comply with certain guidelines set by the USPS. For example, certain of these guidelines specify that the unit must be firmly affixed to a carrier card or to a page of the periodical, and that the sampler must be designed to allow the product to be tested while still in the periodical.

In addition to the requirements set by the USPS, it is generally desirable that the sampler packages be non-bulky for distribution as inserts and also flexible enough to avoid breakage in shipment or storage yet rigid enough to facilitate high speed insertion into the carrier medium. Further, each sampler unit preferably provides approximately one unit dose of the product in an attractive display having artwork or informational copy print printed thereon while providing a transparent or translucent cover film. A sampler package having these aesthetic features will encourage the potential customer to sample the product and enable the consumer to view the actual product to thereby choose the preferred shade or color prior to opening the package.

The advertising sampler disclosed in Parrotta et al., U.S. Pat. No. 5,072,831 is an example of a prior art package which has been used for cosmetic sampling purposes. A relatively thin paste-like transfer layer of a cosmetic product is coated onto a substrate affixed to a carrier card which can be inserted into magazines and catalogues for mass distribution. The product sample is covered by a transparent protective film which is held in place by a glue strip.

The sampler package of Parrotta is generally suitable for products having a substantially solid or highly viscous consistency such as eyeshadow, pressed powder, and lipstick, as the nature of these products allows for a long shelf life. Specifically, the types of cosmetic preparations listed above are capable of remaining compositionally stable under normal indoor environmental conditions for a relatively long period of time. Therefore, the integrity of such product samples can be readily sustained in such a sampler package until use by a consumer without concern about the materials or sealing methods used.

When the product to be sampled is more fluid and/or volatile such as a liquid or gel, on the other hand, prior art cosmetic samplers such as that of Parrotta fail to provide sufficient product longevity. In designing a sampler package for a fluid or volatile product, it is especially important to seal the package in a manner which prevents leakage and rapid evaporation of the product, and also to include an effective barrier layer in the material containing the product sample to maintain the compositional integrity of the product for the desired shelf-life of the samplers.

Several attempts have been made to produce a better sampler package to retain fluid products, such as those disclosed in U.S. Pat. Nos. 5,391,420 and 5,879,769 to Bootman et al. and Greenland, respectively. These samplers provide hermetically sealed label-type packages which include either a metallized barrier layer such as foil or a polymeric barrier layer such as polyethylene or a PVDC coated film for the distribution of fluid or volatile products.

One disadvantage with such label-type prior art fluid samplers is that no portion control is provided. Once the sampler is opened, therefore, the user is left with two separated and messy pieces of film, and the entirety of any unused contents of the sampler remains exposed which can lead to spillage of the remaining contents as well as rapid drying out or evaporation of the product.

Another disadvantage with many prior art samplers designed for fluid product samples is that the product sample is sealed in a package using foil as a moisture barrier layer to prolong shelf life of the sample. Although foil is known to be the most effective type of flexible barrier film against moisture and vapor transmission, the foil layer necessarily renders the package opaque. Thus, samplers which seal the product in foil laminates are most suitable for sampling products such as perfumes or creams, where the color or appearance of the product being sampled does not significantly affect the likelihood of purchase of the product.

The nature of other types cosmetics, on the other hand, such as foundation, is such that a consumer will only consider sampling, and subsequently purchasing, the cosmetic if the shade matches her skin tone or the product is otherwise to her liking. With these products, it is especially important that the sampler package provide a means for a consumer to view the product color or texture before actually opening the unit so as to facilitate selection of the appropriate color.

The polymeric barrier layers such as those disclosed in Bootman and Greenland above can be transparent, so that when used to form the package, the actual product can be viewed through the package without opening the package. However, the polyethylene or PVDC coated film of Bootman and Greenland, while more effective than many other known types of transparent films as barriers against moisture and vapor transmission, do not provide a sufficiently long shelf-life for practical distribution of fluid product samples. Since the samplers may be placed in storage or display for a significant amount of time before being distributed to or obtained by a consumer, and may thereafter be set aside for an additional length of time before use, a liquid product sample contained in one of these samplers has a tendency to substantially dry up often before the consumer has an opportunity to sample the product.

Another type of transparent film known to be used as a moisture barrier is a SiOx coating which has a much lower moisture vapor transmission rate than conventional films such as those mentioned previously and including PVDC coated films. Presently, SiOx is commonly used as a coating on PET bottles and containers. This material, however, is similar to a coating of glass, and is too rigid for use in insert-type cosmetic sampler packages which must withstand a certain degree of flexing and bending during handling. When the silane material is folded or flexed, the moisture vapor barrier properties are severely compromised due to fracturing or cracking of the silane coating.

As demonstrated herein, none of the prior art sampler packages allow a consumer to view the actual product through the packaging while maintaining the compositional integrity of a fluid product sample for a satisfactory time period.

SUMMARY OF THE INVENTION

In view of the foregoing discussion, it is therefore desirable to package a product sampler for containing a fluid or volatile product as an insert in periodical literature in a manner which satisfies the requirements for subscription rate classification as set by the U.S. Postal Service.

It is also desirable to provide an arrangement with a liquid product sampler affixed to literature or a carrier card, wherein the liquid product sample contained in the sampler can be tested by a consumer without contaminating the product with ink printed on the card or literature, and without soiling the printed information on the card or literature.

Furthermore, it is desirable to provide a cosmetic sampler for a fluid or volatile product which overcomes the drawbacks of the prior art noted above. In particular, it is desirable to provide a sampler package, specifically one which allows a consumer to view the shade of the product while preventing the solvent base from evaporating quickly through the sampler material or the sealing points therebetween, and which is flexible enough to avoid breakage in shipment yet rigid enough to permit high speed insertion of package into the carrier medium.

More preferably, it is desirable to provide a product sampler which is relatively flexible and is transparent or translucent to enable viewing of the product sample therethrough, and which also provides moisture vapor barrier qualities on par with that of product samplers which seal the product entirely in foil-containing laminates.

The present invention achieves each of the effects outlined above by securely attaching a product sampler to an insert card to be inserted into a catalog, brochure, magazine, etc., in which the product sampler is made from a composite laminate including a transparent or translucent nonmetallic barrier layer having a moisture vapor transmission rate (MVTR) substantially equivalent to that of a foil film. Specifically, the barrier film used in the present invention has a moisture vapor transmission rate of less than 0.30 g/100 in$^2$/24 hrs @100° F., 90% RH. Preferably, the barrier film has an MVTR of no greater than about 0.065 g/100 in$^2$/24 hrs @100° F., 90% RH. More preferably, the barrier film has an MVTR between about 0.02 to 0.04 g/100 in$^2$/24 hrs @100° F., 90% RH. Additionally, the film is sufficiently flexible so that it may be flexed without cracking.

One preferred material used in the present invention as the nonmetallic barrier layer is a biaxially oriented polyvinylidene chloride film which is included in the composite laminate used to form the sampler package. The structure of the biaxially oriented PVDC film provides superior moisture vapor barrier qualities, while also being thermoformable and having a high resistance to heat and humidity.

Another preferred material for the nonmetallic barrier layer is a modified fluoropolymer film, specifically a polychlorotrifluoroethylene film (PCTFE). PCTFE exhibits a moisture vapor transmission rate similar to biaxially oriented PVDC.

The use of these types of films to form the barrier layer in a composite laminate advantageously permits the production of a transparent cosmetic sampler package which is capable of maintaining the integrity of a product sample to approximately the same extent as if the product was sealed in an entirely foil based laminate package or in a capped bottle or jar. The composite laminate has a thickness which retains the necessary flexibility to withstand flexing yet provides sufficient rigidity to resist wrinkling or folding when inserted into magazines, newspapers, etc.

In the present invention, the biaxially oriented polyvinylidene chloride or polychlorotrifluoroethylene film is preferably laminated with the other layers by adhesive lamination, but may also be laminated by coextrusion. Each layer in the composite laminate is transparent or translucent, including the barrier layer film, so as to enable viewing of the color and texture of the product contained therein.

The product sampler is formed by sealing together a top and a bottom composite laminate to form a pouch in a desired shape for containing the product sample and includes a window through which the product may be viewed. The pouch is shaped to include a nozzle and is perforated across the nozzle so that the sampler can be easily opened and the product can be controllably dispensed through the nozzle.

For distribution through the mail system or to disseminate information about the product to consumers concurrently with the product sample, the sampler is affixed to a carrier card which may be inserted into a magazine, periodical, brochure or other literature. A sampling surface is provided on the carrier card so that the fluid product expelled from the opened pouch flows onto the sampling surface. The sampling surface prevents the product from becoming contaminated with printing ink when released onto the carrier card. The carrier card is also protected from the liquid product being absorbed into the card material and thereby soiling any information contained on the card, such as any coupons provided thereon.

The sampler package of the present invention is suitable for use with cosmetic type products having a solvent base containing water and/or other organic solvent, including but not limited to liquids including liquid cosmetics, creams, gels, lotions, ointments, shampoos, perfumes, fragrances, and other forms of semi-liquids, semi-solids, personal care products and beauty aids, etc.

Other features and advantages of the present invention will become apparent from the following description of the invention which refers to the accompanying drawings.

DETAILED DESCRIPTION OF THE PREFERRED EMBODIMENTS

Figure 1A:
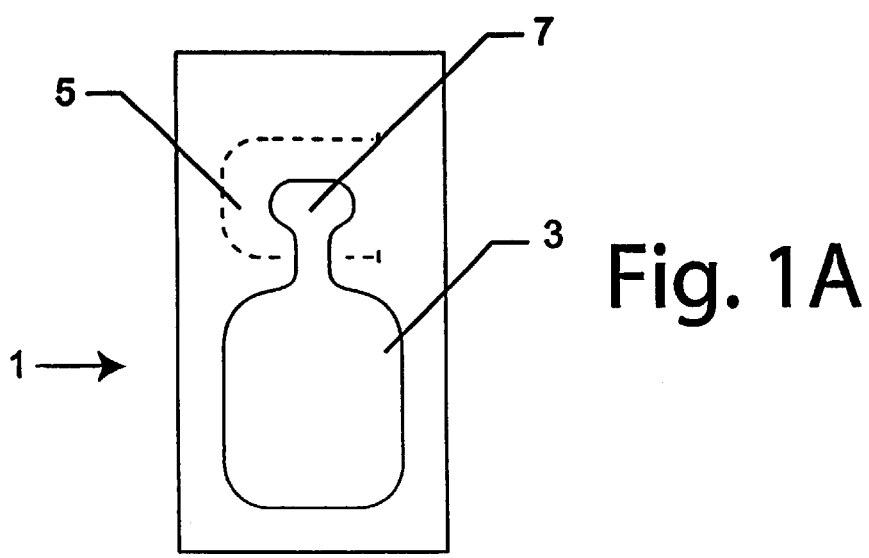
FIG. 1A shows a top view of a preferred embodiment of a product sampler according to the present invention.
Figure 2:
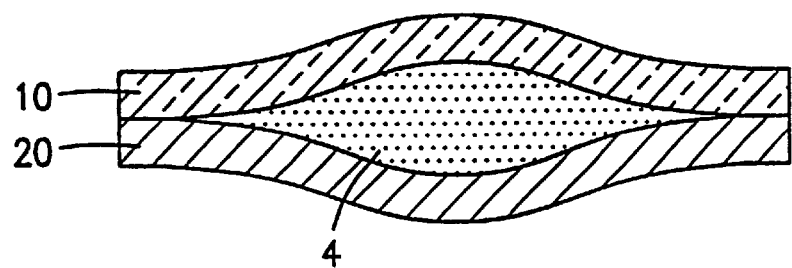
FIG. 2 shows a cross-sectional view of the sampler shown in FIG. 1A taken along the line 2—2.

A preferred embodiment of a cosmetic sampler in accordance with the present invention is shown in FIG. 1A. The illustrated sampler 1 has a pouch 3 containing a sample of a liquid based cosmetic product 4. The pouch is shaped to form a dispensing tip 7 and can be opened by pulling tab 5 formed across the upper portion of the sampler 1 through dispensing tip 7. The pouch is formed by sealing a transparent or translucent composite laminate forming a cover film 10 (FIG. 2) to an opaque composite laminate forming the backing film 20 of the sampler package.

Cover film 10 contains a layer of a transparent or translucent polymeric barrier film having a moisture vapor transmission rate (MVTR) no greater than about 0.065 g/100 in$^2$/24 hrs @100° F., 90% RH. Preferably, the barrier film has an MVTR substantially competitive with that of a film of aluminum foil and between about 0.02 to 0.04 g/100 in$^2$/24 hrs @100° F., 90% RH.

Suitable materials for the moisture vapor barrier layer include a biaxially oriented polyvinylidene chloride (biax-PVDC) film, such as BARRIALON®-UB film manufactured by Asahi Chemical Industry, Co., Ltd. and distributed by Phoenix Films, Inc., or a modified fluoropolymer film such as a polychlorotrifluoroethylene (PCTFE) film familiar to those knowledgeable in the art as ACLAR®, manufactured by Allied Signal Corp. Both the biax-PVDC film and the PCTFE film have MVTR values within the desired range and are also transparent.

Figure 3A:
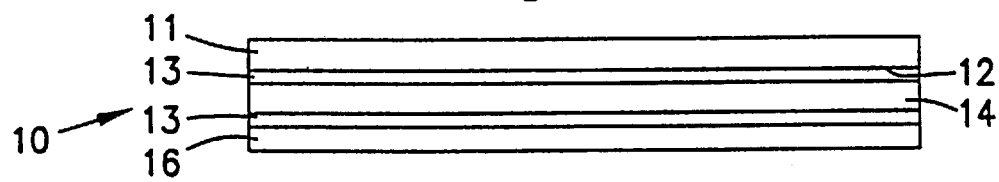
FIG. 3A shows a schematic view of the layers forming the transparent composite laminate film according to a preferred embodiment of the present invention.

A preferred embodiment of cover film 10 is shown in FIG. 3A and has a thickness of approximately 4.5 to 5.0 mils, with the barrier film preferably having a thickness of up to approximately 2 mils. More preferably, the barrier film is about 1 mil thick in sampler packages for most products. Cover film 10 additionally includes an exterior layer 11, and a heat seal layer 16 to enable heat sealing of the cover film 10 with the backing film 20 described below.

Exterior layer 11 is preferably made from polyester, while heat seal layer 16 is preferably made from a blend of high density and low density polyethylene. Other suitable transparent or translucent polymeric films may be substituted for exterior layer 11. Similarly, other types of heat seal layers may be used, such as polyester, which is an excellent chemically resistant barrier. Additional layers may also be included in cover film 10 in accordance with various aspects of the present invention, such as additional barrier layers and/or other films to augment the sealing layer. Each layer in cover film 10 is transparent or translucent, so as to provide a sampler package which enables viewing of the color and texture of the product to be sampled.

The various layers of cover film 10 are preferably adhesively laminated together using adhesive layers 13 made of, for example, a polyurethane adhesive. Alternatively, the cover film layers may be coextrusion laminated using tie layers made from materials such as ethylene vinyl acetate, ethylene methacrylate or ethylene vinyl alcohol. As mentioned above, additional layers may be coextruded with the barrier film and may include films made of an oriented polypropylene or linear low density polyethylene.

The plurality of layers in the composite laminate forming cover film 10 further enhances the moisture barrier properties of the foil-like MVTR of the barrier film. Moreover, the composite laminate is stiff enough to provide sufficient rigidity to resist wrinkling or folding during handling, yet retains the necessary flexibility to withstand flexing without cracking or otherwise compromising its barrier qualities.

In order to define a window through which the product sample is viewed, a window design 3 and/or copy print may be printed onto either the exterior surface of the top layer 11 using any known method of printing onto a film, or onto the interior surface thereof by reverse surface printing prior to lamination with the barrier film 14.

The backing film 20 preferably comprises a heat seal layer 21, a polyethylene layer 23, a foil barrier layer 25, and a polyester exterior layer 27, and having a combined thickness of about 4.5–5.0 mils. Barrier layer 25 is preferably an aluminum foil film having a thickness at least about 0.20 mil (MVTR<0.01 g/100 in$^2$/24 hrs @100° F.,90% RH). As in cover film 10, heat seal layer 21 may be comprised of a high density/low density polyethylene blend or other suitable material. Similarly, additional layers may be included or suitable alternative materials may be substituted as described above.

The layers forming the composite laminate of backing film 20 are preferably adhesively laminated with adhesive layers 22 made from a material such as a polyurethane or other suitable adhesive. Alternatively, the layers of backing film 20 may be coextrusion laminated using tie layers made from materials such as ethylene vinyl acetate, ethylene methacrylate or ethylene vinyl alcohol.

In another embodiment of the present invention, the foil film may be substituted with a transparent or translucent barrier film as used in the cover film. In this embodiment, backing film 20 has a composition substantially similar to that of cover film 10, such that each layer is transparent or translucent. Backing film 20 may also contain a window design and/or copy print as described above with respect to cover film 10.

Cover film 10 and backing film 20 are sealed together to form pouch 3. In the embodiment in which both cover film 10 and backing film 20 include the transparent and translucent film as the barrier layers, the entire package can be made from one composite laminate by sealing the laminate to itself to form pouch 3. Although heat sealing is the preferred method of sealing, other sealing methods are also consistent with the present invention, such as dielectric sealing, radiant sealing, sonic sealing, high frequency sealing, etc.

Figure 1B:
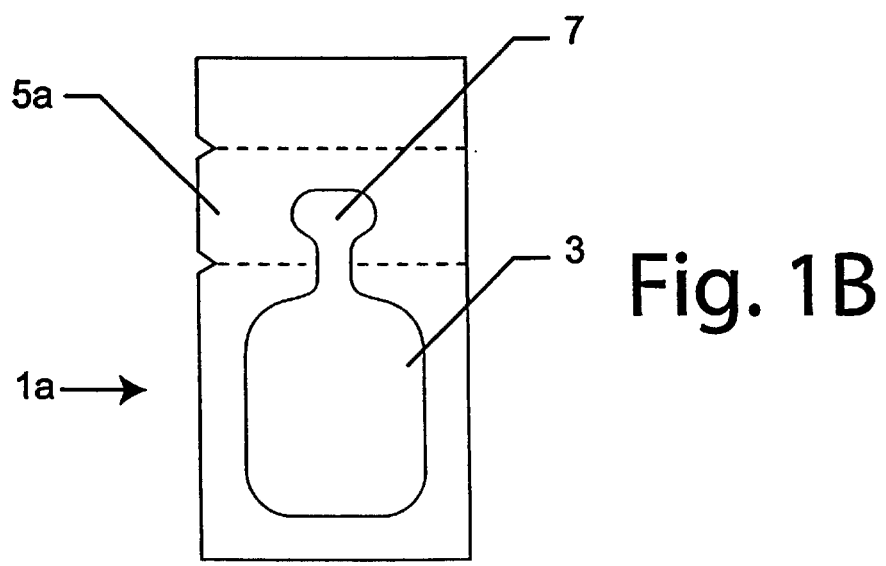
FIG. 1B shows a top view of a first variant of the product sampler shown in FIG. 1A.
Figure 1C:
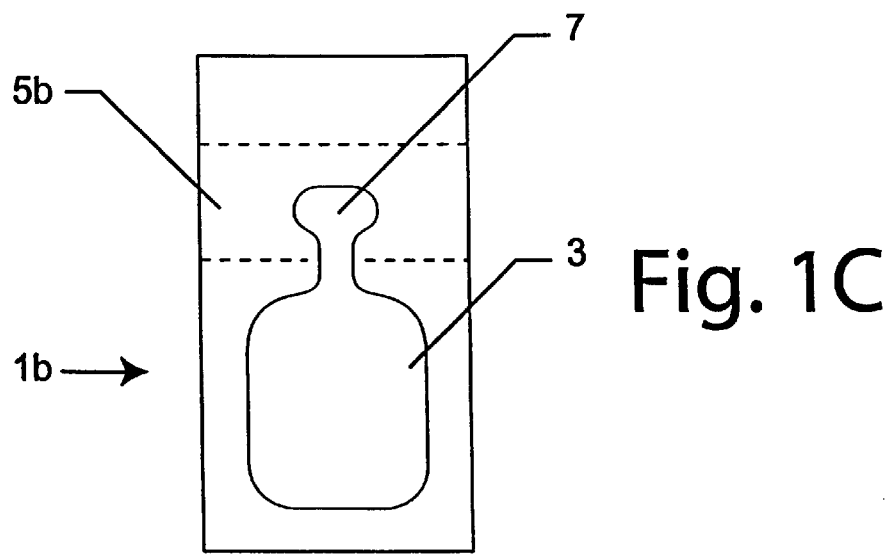
FIG. 1C shows a top view of a second variant of the product sampler shown in FIG. 1A.

In the process for forming the sampler package shown in FIGS. 1A–1C, a roll of the transparent composite laminate 10 and a roll of the foil barrier composite laminate 20 are fed to a die which seals together the heat seal layers of each composite laminate in a shape which partially forms a plurality of sampler pouches 3 along a continuous strip of sampler packages. This initial sealing process leaves a portion of each pouch unsealed, up to approximately one-half the perimeter of a finished pouch. The roll of partially heat-sealed pouches is then sent to the next processing stage, where each pouch is placed under a nozzle which fills the cosmetic sample into the pouch.

Where the samplers are produced for distribution in magazines, mailers, or the like, each sampler package measures about 3" by 1-½" and is filled with approximately 350 mg of the liquid cosmetic in each pouch. For alternative means of distribution, such as department store handouts, more or less of the sample may be filled in each pouch and the size of the sampler package may be increased or decreased without varying from the scope of the invention.

After filling, the unsealed perimeter of each pouch is sealed to form a continuous strip of sealed packages. At this time, extended dispensing tip 7 is formed at the top of each pouch shape for ease of dispensing the product upon being opened by the consumer. Moreover, the nozzle shape of dispensing tip 7 restricts the flow of the product to a controllable rate upon opening of the sampler by a user. Alternatively, the sampler units can be formed by sealing together the top and bottom laminates to fully define the pouch shape except for the bottom of the pouch, whereupon the pouch is then filled as described above from the lower edge of the sampler pouch. After filling, the pouch is then sealed along the bottom.

Ultimately, the composition of the composite laminates, the width of the sealed region surrounding the pouch 3 including the dispensing tip 7, and the volume of product filled into the pouch may be varied according to the preferences of the manufacturer or the buyer of the manufactured samplers. However, each of these variables should be adjusted in accordance with the other variables so that the finished sampler can withstand high pressure to prevent rupture or burst failure during binding into literature or during shipping and/or storage.

Next, each sampler package in the roll is die cut to form the perforated tab 5 across the dispensing tip 7. In the embodiment shown in FIG. 1A, the tab is cut in a U-shape to form a pullable strip extending across the tip 7. In an alternative embodiment shown in FIG. 1B, for example, the opening tab can be more simply formed by cutting two notches along one edge of the sealed sampler and extending perforations from the inner-most position of each notch toward the opposite edge of the sampler and across the dispensing tip 7. In a further embodiment shown in FIG. 1C, the tear-open tab can simply be indicated by the two lines of perforations extending across the unsealed region 8 and the dispensing nozzle 7 from one side of the sampler to the other.

The roll of sampler packages is then cut through the sealed regions between the pouches to separate the roll into individual samplers. Optionally, the roll can be cut so that a strip of samplers having a plurality of individual pouches, to produce a multiple sample unit for distribution.

For distribution through the mail or accompanied by literature, the individual samplers are affixed to a carrier card 30 with a sampling surface 40 affixed to the carrier card 30 under the dispensing tip 7 and tab 5 region of sampler 1.

Sampling surface 40 is preferably formed as a coated substrate which prevents moisture from the product being wicked or absorbed into the substrate or the carrier card. Suitable materials for the substrate include plastic, fabric, film, foam, paperboard or paper, or any combination thereof. The material coating the substrate may an extruded plastic, fabric, foam, foil, or laminate of plastic film. Preferably, sampling surface 40 is formed as a foil coated board.

As described above, sampling surface 40 is preferably a separate piece which is permanently adhered to carrier card 30. Alternatively, however, sampling surface 40 may be formed as a portion of or formed directly on the surface of the carrier card at the appropriate location. For example, sampling surface 40 can be formed as a foil sheet, a barrier film, or film laminate stamped or applied directly onto the surface of the carrier card, without being coated onto a separate substrate.

Figure 4:
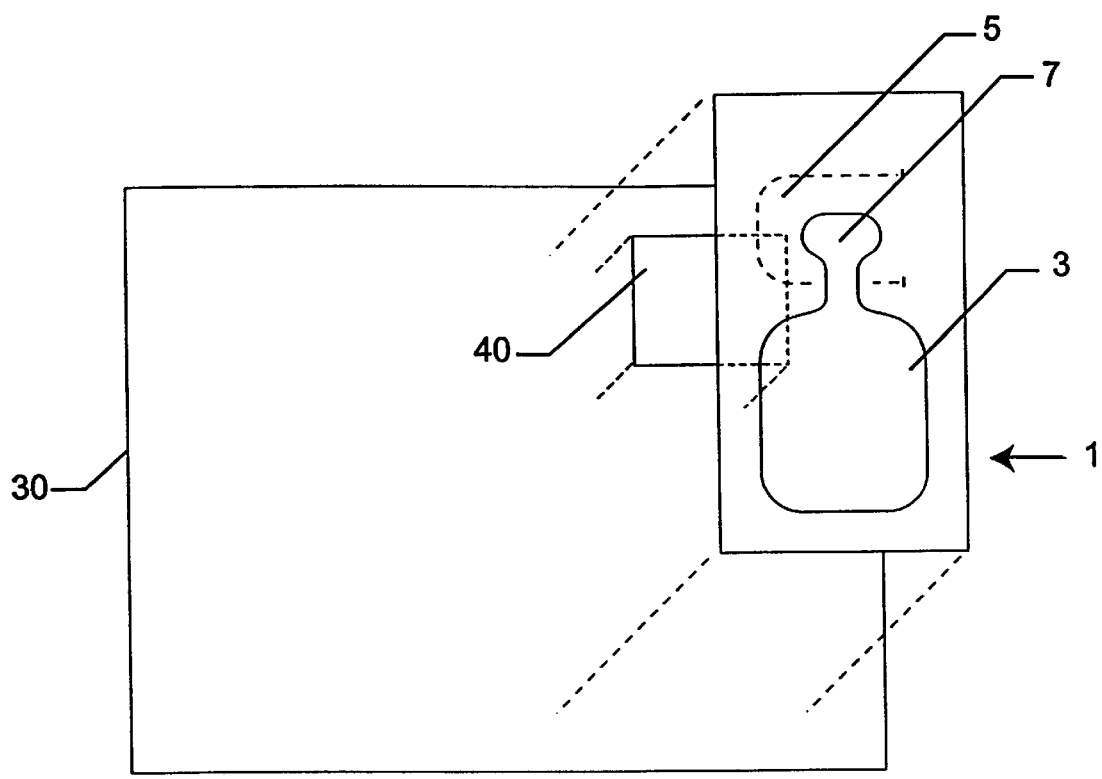
FIG. 4 shows an exploded view of a subscription-rate insert including the sampler shown in FIG. 1A, a protective sampling surface, and a carrier card according to the present invention.
Figure 5A:
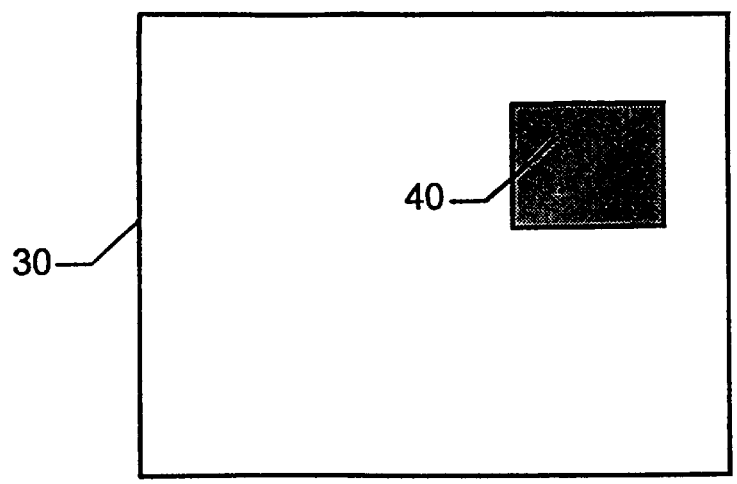
FIG. 5A shows a top view of the sampling surface affixed to the carrier card.
Figure 5B:
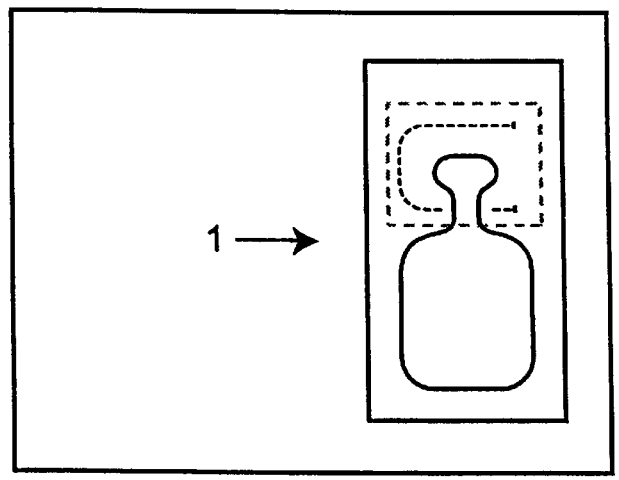
FIG. 5B shows a top view of the insert assembled as shown in FIG. 4.

As can be seen in FIGS. 4, 5A and 5B, sampling surface 40 is affixed to carrier card 30 and sampler 1 is affixed to carrier card 30 such that dispensing tip 7 and perforated tab 5 are placed over the sampling surface 40. As with sampling surface 40, sampler 1 is permanently affixed to carrier card 30. To affix the sampler unit to carrier card 30, an adhesive material is applied either to carrier card 30 at the desired location or to the rear surface of the sampler unit, leaving the area behind the tear-open strip unsealed to the card so that the strip may be pulled open. Upon application of the adhesive to either the carrier card or the sampler unit, the sampler unit is affixed to the carrier card with the application of pressure. The adhesive used to secure the sampler strip to the main card is preferably a permanent adhesive such as a hot melt or any other type of permanent adhesives.

The substrate material used to form carrier card 30 is preferably a sheet of thin paperboard, although other suitable materials may also be used, such as synthetic paper or a light plastic such as a polyethylene/calcium carbonate blend. The material selected to make carrier card 30 must be sufficiently rigid to facilitate insertion thereof by machines into periodical literature, brochures, etc.

Copy print such as advertising information or sampling instructions may be printed on either or both the front and back surfaces of carrier card 30, and may also be printed on the top composite laminate of the sampler. The carrier card may also include a coupon which may be printed on either or both the front and back surfaces of the carrier card for removal by the consumer for redemption upon purchase of the product.

To access the product sample contained in the sampler, a user simply grasps the die-cut or notched end of the tab 5 and peels the strip back towards the opposing edge to tear along the perforations until dispensing tip 7 is unsealed, whereupon the product can be dispensed by squeezing or pushing on the sampler unit to remove the desired amount. The fluid product released from the sampler thus flows onto the sampling surface 40. The resulting cutout region formed by the sealed laminates surrounding the space left by the peeled away strip defines a reservoir area to restrict the area in which the contents flow upon opening the sampler. Moreover, the entire reservoir area is located over sampling surface 40. To further minimize leakage onto the page, when sampler 1 is affixed to carrier card 30 after sampling surface 40 is affixed thereto, sampler 1 can be adhered to sampling surface 40 along the four sides outside of perforated tab 5 to ensure containment of the fluid product to the reservoir when released from pouch 3.

Additionally, the composite laminates preferably have sufficient rigidity so that upon dispensing the needed amount, the user may be enabled to reclose the sampler by replacing the tab portion back into planar alignment with the main portion of the sampler. Since any unused portion of the product sample would only be exposed to the ambient air along the opened width of dispensing tip 7, replacing the tab portion into alignment with the sampler recovers the opened length to minimize drying out or evaporation of the product sample.

With the composite sampler and carrier card unit according to the present invention, a user can open the sampler and apply the product using her fingertip or an applicator without the coloration of the product becoming contaminated by printing ink from the carrier card. Also, especially if the carrier card contains a coupon to be applied towards a purchase of the product, the coupon is protected from being rendered unusable by the wicking of the product fluid into the coupon. Similarly, the dryness of the carrier card is maintained, thus avoiding any potential mess that would be created by contacting a wet or soiled carrier card with other items, while also preserving the legibility of any other information printed on the carrier card. Furthermore, the composite card and sampler unit complies with all postal regulations for subscription rate mail distribution and is therefore suitable for insertion or binding into magazines, catalogs, brochures, etc.

In the example shown in FIGS. 6A and 6B, only one sampler unit is affixed to the carrier card 30. Optionally, however, a plurality of product samples may be provided on one carrier card, which may be provided in the form of a sampler strip.

Assembled in this manner, the sampler unit is firmly affixed to the carrier card in a manner which permits sampling of the product while remaining affixed thereto. Of course, the carrier card with the sampler unit adhered thereto may be distributed as is without being attached to any other carrier (literature) medium.

As previously mentioned, biaxially oriented polyvinylidene chloride film (biax-PVDC) or polychlorotrifluoroethylene (PCTFE) film may be used as the moisture vapor barrier layer in at least the cover film according to one preferred embodiment of the present invention. The advantages provided by these films are demonstrated by the data shown in FIGS. 6 and 7, and in Tables I–V.

Figure 6:
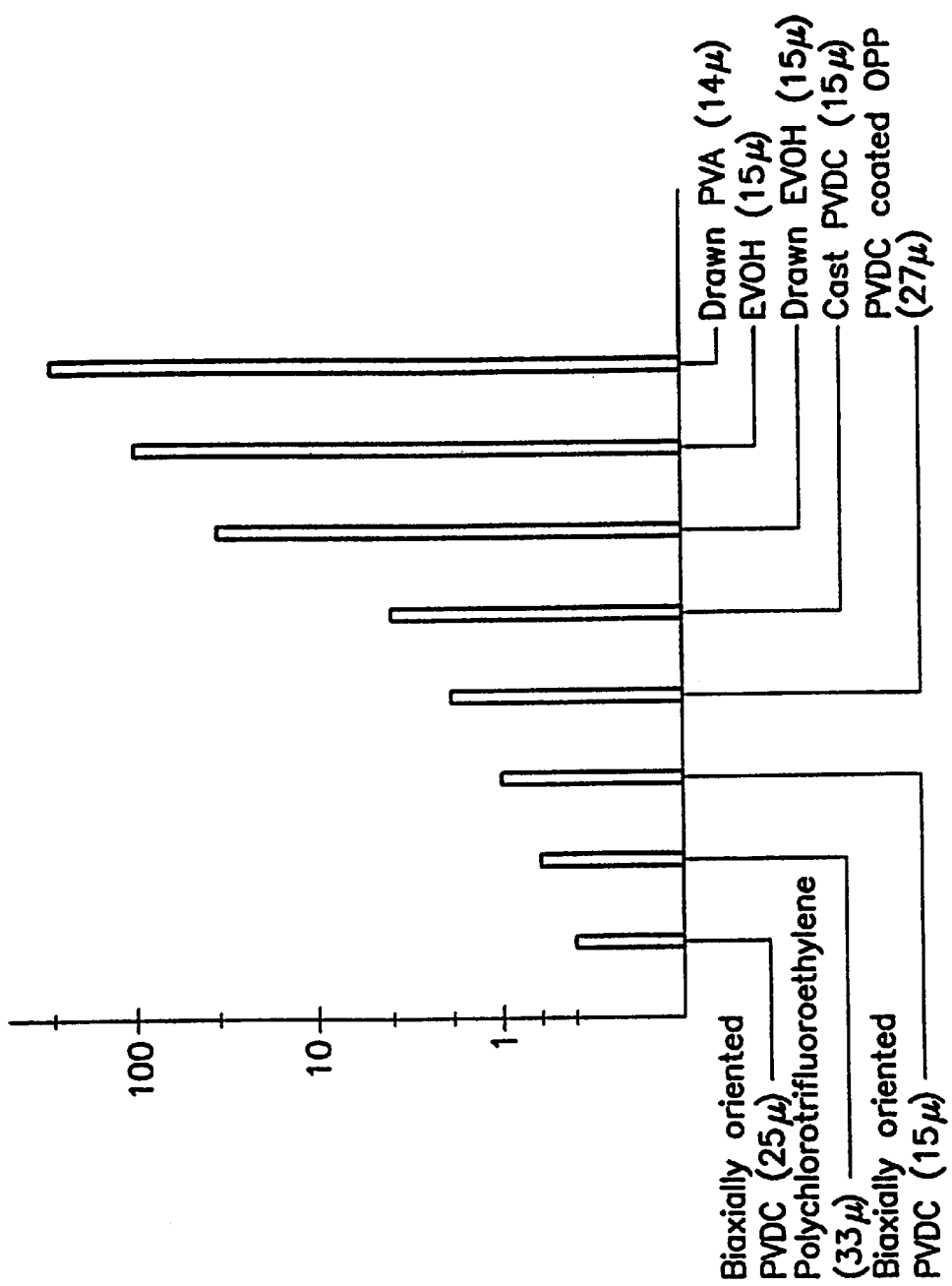
FIG. 6 shows a graphical comparison of the moisture vapor permeability of various polymeric barrier films including the barrier films used in the present invention.

FIG. 6 shows that the water vapor transmission rates of the biaxially oriented PVDC film and of the PCTFE film are much lower than typical films such as cast PVDC films and PVDC coated films used in the prior art. For example, a biax-PVDC film having a thickness of 0.6 mils ($15\mu$) has a water vapor transmission rate of about 0.065 g/100 in$^2$/24 hrs @100° F.,90% RH (1 g/m$^2$/24 hrs @40° C., 90% RH), whereas a PVDC coated oriented-polypropylene film of 1.1 mils ($27\mu$), nearly twice the thickness of the former, has a water vapor transmission rate of about 0.26 g/100 in$^2$/24 hrs @100° F.,90% RH (4 g/m$^2$/24 hrs @40° C.,90% RH). Similarly, a 1.3 mil ($33\mu$) PCTFE barrier film is shown to have an MVTR of about 0.05 g/100 in$^2$/24 hrs @100° F.,90% RH, which is substantially equivalent to that of the 1.0 biax-PVDC film.

Figure 7:
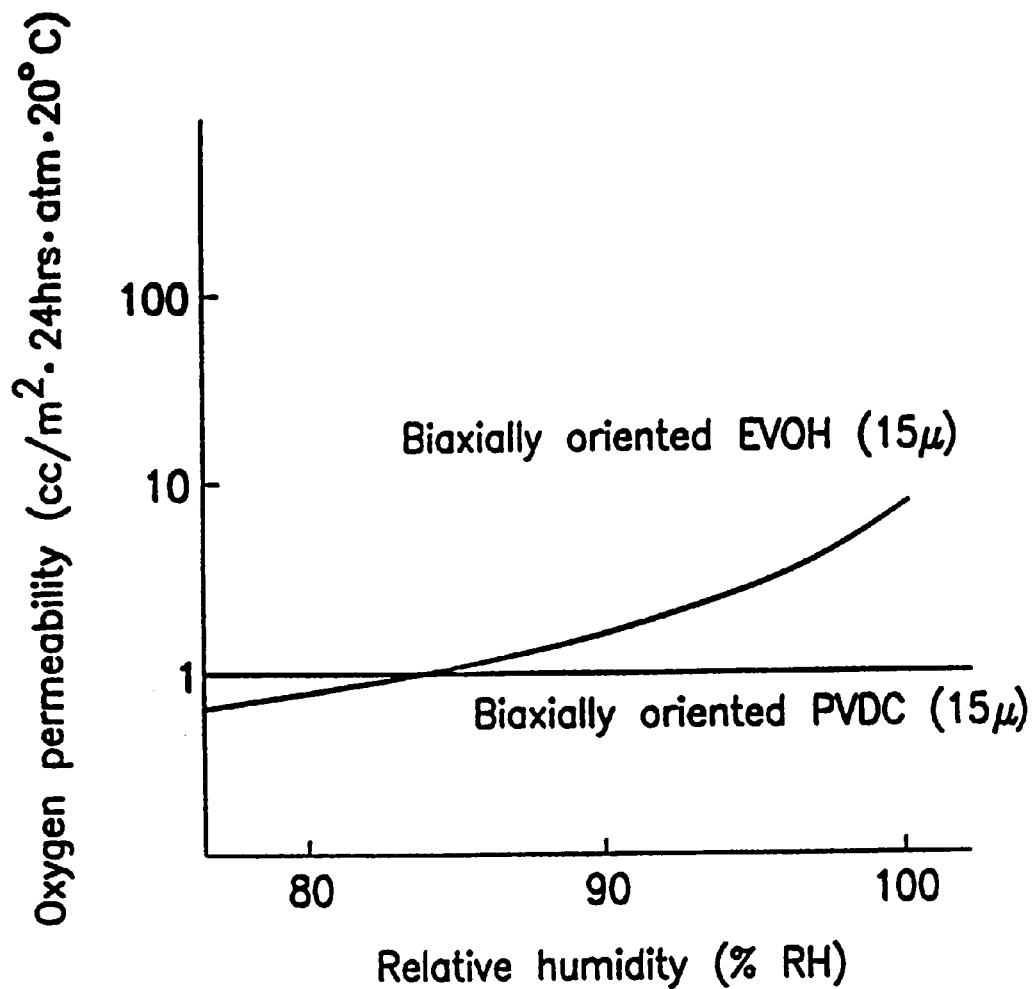
FIG. 7 shows a graphical comparison of the humidity dependency of the oxygen permeability of the barrier film used in the present invention compared to other types of known barrier films.

The oxygen transmission rate of the 0.6 mil ($15\mu$) biax-PVDC film is shown in FIG. 7 relative to percent relative humidity. Specifically, FIG. 7 shows that the oxygen transmission rate is not affected by environmental humidity.

Table I demonstrates the relationship between the thickness of the film to the moisture vapor and oxygen transmission rates.

TABLE I

| Thickness | mil | 0.6 | 1.0 | 2.0 |
|---|---|---|---|---|
| | ($\mu$) | (15) | (25) | (50) |
| Water Vapor Transmission Rate | g/100 in$^2$/24 hrs @ 100° F., 90% RH (g/m$^2$/24 hrs @ 38° C., 90% RH) | 0.065 (1.0) | 0.04 (0.6) | 0.02 (0.3) |
| Oxygen Transmission Rate | cc/100 in$^2$/24 hrs @ 73° F., atm (cc/m$^2$/24 hrs @ 23° C., atm) | 0.10 (1.4) | 0.06 (0.9) | 0.03 (0.5) |

Test results comparing the moisture vapor properties of several types of composite laminates using different barrier layers are shown below in Tables II–V. For each sample, a clear laminate incorporating the specified barrier layer was sealed to itself to form a pouch having the barrier laminate as the front and back thereof, i.e. single-web construction. Four sets of each type of barrier laminate package were tested, with two sets of each type filled with water and the remaining sets filled with a liquid cosmetic product. Of the two sets of each sample type, one set was tested at 110° F. while the other set was tested at 120° F. The percentages of moisture loss by weight was obtained after one week and after two weeks.

TABLE II

Laminate of 0.7 mil PVDC Coating on
Oriented Polypropylene (% Moisture Loss by Weight)

| | 110° F. | 120° F. | Product |
|---|---|---|---|
| 1 week | 2.16–2.36 | 2.42–2.70 | water |
| 2 weeks | 4.54–5.17 | 5.09–5.95 | water |
| 1 week | 1.95–2.44 | 2.74–4.12 | liquid cosmetic |
| 2 weeks | 5.02–5.45 | 5.34–6.3 | liquid cosmetic |

TABLE III

Laminate of 2.0 mil Aluminum Oxide
(% Moisture Loss by Weight)

| | 110° F. | 120° F. | Product |
|---|---|---|---|
| 1 week | 2.1–2.94 | 2.04–4.15 | water |
| 2 weeks | 3.9–5.15 | 3.90–7.37 | water |
| 1 week | 2.24–3.49 | 2.27–3.63 | liquid cosmetic |
| 2 weeks | 4.0–6.18 | 4.06–6.48 | liquid cosmetic |

TABLE IV

Laminate of 1.0 mil Biaxially Oriented PVDC
(% Moisture Loss by Weight)

| | 110° F. | 120° F. | Product |
|---|---|---|---|
| 1 week | 1.20–1.40 | 1.39–1.58 | water |
| 2 weeks | 2.25–2.74 | 3.0–3.45 | water |
| 1 week | 1.21–1.49 | 1.63–1.80 | liquid cosmetic |
| 2 weeks | 2.67–3.14 | 3.4–3.90 | liquid cosmetic |

TABLE V

Laminate of 1.3 mil Polychlorotrifluoroethylene Film
(% Moisture Loss by Weight)

|  | 110° F. | 120° F. | Product |
| --- | --- | --- | --- |
| 1 week | 1.15–1.62 | 1.25–1.85 | water |
| 2 weeks | 2.33–3.11 | 2.61–3.82 | water |
| 1 week | 0.61–0.76 | 0.66–0.88 | liquid cosmetic |
| 2 weeks | 1.25–1.47 | 1.38–1.86 | liquid cosmetic |

As can be seen from Table II, the moisture loss in the PVDC coated OPP laminate packages ranged from 4.5% to 5.5% of the original weight after two weeks at 110° F. This result is extrapolated to yield a moisture loss of over 12% after one year at room temperature.

In contrast, the moisture loss in the biaxially oriented PVDC barrier laminate packages after two weeks at both test temperatures ranged from 2.25% to 3.9% of the original sample weight, as shown in Table IV. These results obtained after a test period of two weeks at 110° F. and 120° F. can be extrapolated to be equivalent to the moisture that would be lost over a period of 6–8 months at room temperature.

During testing, it was found that the moisture loss from a sample of a liquid cosmetic sealed in a single web of biax-PVDC laminate did not result in any adverse change in texture of the cosmetic when observed even after 10 months at room temperature. Thus, a single web package made from the biax-PVDC laminate easily provides a usable product sample for a minimum shelf life of six months.

Moreover, when the package is made with a foil laminate on one side, as discussed above with respect to the preferred embodiments of the present invention, the moisture loss ranged from 2.5% to 3.0% of the original sample weight for one month at 110° F. and 120° F. By extrapolation, this is the moisture loss that can be expected for a package of this construction after a period of one year at room temperature.

Table V shows that the results obtained for the PCTFE laminate packages are similar to the results obtained for the biax-PVDC packages. Specifically, the moisture loss from the PCTFE laminate packages after two weeks at 110° F. and 120° F. range from 1.25% to 3.82% of the original sample weight. Thus, the extrapolated shelf life at room temperature of the PCTFE laminated packages is comparable to the biax-PVDC based packages.

Due to the excellent gas and moisture vapor barrier properties of the sampler package containing moisture vapor barrier films having an MVTR ≦0.065 g/100 in²/24 hrs @100° F.,90% RH as discussed above, samples of cosmetic products having a fluid base such as water or other organic solvent may be distributed in a manner which displays the shade of the cosmetic product to the consumer through the package while maintaining the compositional integrity of the product for a much greater time period than previously obtained with cosmetic sampler packages previously used in the art.

Figure 3B:
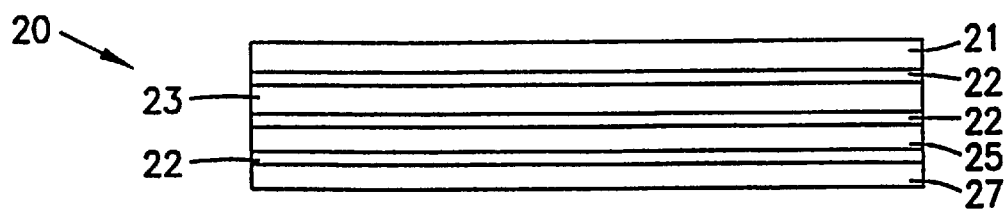
FIG. 3B shows a schematic view of the layers forming the composite laminate of the backing of a cosmetic sampler according to a preferred embodiment of the present invention.

Although the above described composition of the composite laminates are preferred, in still other embodiments of the present invention, both the top and the bottom composite laminate of the sampler may include the transparent barrier layer, or both may include a foil barrier layer. Furthermore, the composition of the composite laminates may be varied from that disclosed above with reference to FIGS. 3A and 3B to exclude layers described above, or to include other layers suitable for incorporation in the respective composite laminates.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A product sampler package comprising:

a carrier card;

a sampling surface provided on the carrier card; and a sampling unit affixed to the carrier card and over the sampling surface, wherein the sampler unit comprises:
   a first composite laminate including a first moisture barrier layer, wherein at least a portion of the first composite laminate is transparent or translucent; and
   a second composite laminate including a second moisture barrier layer, said first and second composite laminates being sealed together to define an enclosed pouch for containing a sample of a fluid cosmetic product such that the enclosed pouch has a nozzle shaped dispensing tip for controlling a flow of product dispensed from the pouch,
wherein the sealed laminates are die cut to form a frangible tab and strip extending across the nozzle shaped dispensing tip to facilitate opening the sampler to access the product,
wherein the nozzle shaped dispensing tip and the frangible tab are disposed over the sampling surface so that the sampling surface forms a barrier between the sampler unit and the carrier card, such that when a fluid product is dispensed from the sampler, moisture from the fluid product is prevented from contacting or being absorbed by the carrier card, and
wherein the first and second moisture vapor barrier layers each has a moisture vapor transmission rate no greater than about 0.065 g/100 in²/24 hrs @ 100° F., 90% RH, and the first moisture vapor barrier layer is a nonmetallic flexible film.

2. The product sampler package according to claim 1, wherein when the strip is pulled open across the dispensing tip, the peripheral portions of the sealed laminates surrounding the shape of the tab and strip define, along with the sampling surface, a reservoir area for containing the dispensation of the product to a defined region.

3. The product sampler package according to claim 1, wherein the sampling surface includes a substrate and a coating material provided on the substrate, and the sampling surface is adhered onto the carrier card.

4. The product sampler package according to claim 3, wherein the sampling surface substrate is selected from the group consisting of paperboard, paper, plastic, fabric, film, foam, and combinations thereof.

5. The product sampler package according to claim 3, wherein the coating material on the sampling surface is selected from the group consisting of foil, plastic, fabric, film, foam, and a film laminate.

6. The product sampler package according to claim 1, wherein the sampling surface substrate is formed as a barrier layer applied directly onto the surface of the carrier card.

7. The product sampler package according to claim 1, wherein the frangible tab and strip are formed by a U-shaped die cut formed in the sampler unit.

* * * * *